Figure 1:
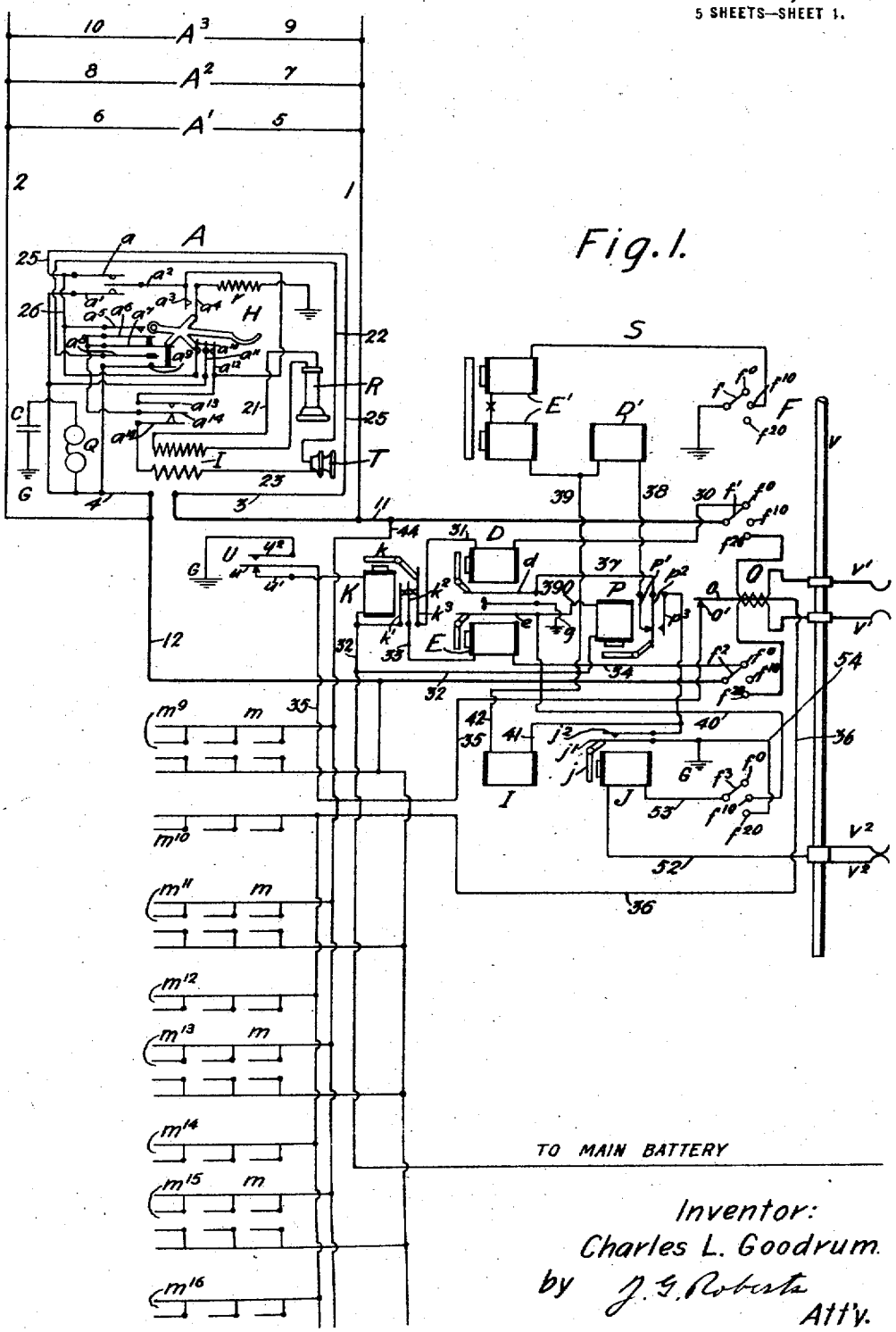

C. L. GOODRUM.

AUTOMATIC TELEPHONE EXCHANGE SYSTEM.

APPLICATION FILED FEB. 28, 1916.

Reissued June 20, 1922.

15,389.

5 SHEETS—SHEET 1.

Inventor:
Charles L. Goodrum.
by J. G. Roberts
Att'y.

C. L. GOODRUM.

AUTOMATIC TELEPHONE EXCHANGE SYSTEM.

APPLICATION FILED FEB. 28, 1916.

Reissued June 20, 1922.

15,389.

5 SHEETS—SHEET 2.

Inventor:
Charles L. Goodrum.
by J. E. Robertson Att'y.

C. L. GOODRUM.

AUTOMATIC TELEPHONE EXCHANGE SYSTEM.

APPLICATION FILED FEB. 28, 1916.

Reissued June 20, 1922.

15,389.

5 SHEETS—SHEET 3.

Inventor:
Charles L. Goodrum
by J. G. Roberts
Att'y

C. L. GOODRUM.

AUTOMATIC TELEPHONE EXCHANGE SYSTEM.

APPLICATION FILED FEB. 28, 1916.

Reissued June 20, 1922.

15,389.

5 SHEETS—SHEET 4.

Inventor:
Charles L Goodrum
by J. G. Roberts Att'y.

C. L. GOODRUM.

AUTOMATIC TELEPHONE EXCHANGE SYSTEM.

APPLICATION FILED FEB. 28, 1916.

Reissued June 20, 1922.

15,389.

5 SHEETS—SHEET 5.

Inventor:
Charles L. Goodrum.
by J. S. Roberts
Att'y.

UNITED STATES PATENT OFFICE.

CHARLES LANE GOODRUM, OF NEW YORK, N. Y., ASSIGNOR, BY MESNE ASSIGNMENTS, TO WESTERN ELECTRIC COMPANY, INCORPORATED, OF NEW YORK, N. Y., A CORPORATION OF NEW YORK.

AUTOMATIC TELEPHONE-EXCHANGE SYSTEM.

15,389. Specification of Reissued Letters Patent. Reissued June 20, 1922.

Original No. 1,156,475, dated October 12, 1915, Serial No. 249,380, filed March 10, 1905. Application for reissue filed February 28, 1916. Serial No. 81,049.

*To all whom it may concern:*

Be it known that I, CHARLES LANE GOODRUM, a citizen of the United States, residing at New York, in the county of New York and State of New York, have invented certain new and useful Improvements in Automatic Telephone-Exchange Systems, of which the following is a full, clear, concise, and exact description.

This invention relates to automatic telephone exchange systems, and more particularly to systems of this type adapted for party line service.

One of the objects of this invention is to provide means whereby one only per connection of a plurality of subscriber stations on a line may be selectively called by any other subscriber in the exchange system.

Another object of this invention consists in the provision of means in an automatic telephone system, whereby a selectively operable switching device may be caused to select and seize certain lines irrespective of the busy or idle condition thereof, said switching device being provided with testing means for preventing the seizure of busy lines, if said first mentioned means is not operated.

Another object of this invention resides in the provision of means whereby a subscriber on a party line is enabled to make a revertive call; that is, to call another subscriber on the same line in spite of the busy test placed on the test conductor of each line when the line is taken for use.

A further object consists in means to prevent a release of the switches by a party line subscriber as long as the telephone receiver of another subscriber station connected to the line is off the switchhook.

Other features of the invention will become apparent from the following description and the appended claims.

The invention is directed to a system in which every party line is provided with groups of outgoing multiple terminals equal in number to the number of subscribers on the party line. Each subscriber on a party line is signaled with a characteristic kind of ringing current, and the outgoing terminals, of the various party line subscribers that are signaled by the same kind of current, are gathered or grouped in certain of the switching devices of the system. These switching devices are individual to a particular type of signaling current, which will selectively signal the subscriber station individual to the terminals selected by the switching device.

Any system equipped with party-line service must naturally be provided with means so that a subscriber at one of the subscriber stations of the party line can signal and communicate with a subscriber at another substation on the same line. The ordinary busy test in such a case will give a false busy indication, because a test guard has been placed upon the multiple terminals of the line by reason of the use of that line in calling and not because it is engaged by some other subscriber. This false "busy" is obviated by momentarily removing the same when the line and test wipers of the connector switch are brought into contact with the line terminals of the calling subscriber's line.

In automatic telephone systems the release of the switches used in setting up a connection is ordinarily accomplished by the subscriber hanging up his receiver. This operation would result in a premature disconnect on a connection involving a party line subscriber in case one of the subscribers on the party line other than the one engaged in conversation were to remove his receiver from the switchhook and, finding the line busy, restore. To avoid a premature disconnect of this kind means are provided to prevent the release of the switches by a party-line subscriber as long as any other subscriber station on the line is taken for use.

The party-line scheme is shown as applied to an automatic system using switches of the Strowger type, and it will be quite obvious that anyone skilled in the art could readily adapt this system to any of the other types of well known automatic switches. The general operation of an automatic system using Strowger switches is old in the art and well known, and the description herein will be restricted, therefore, to a brief outline of the general operation of this system, emphasizing the features appertaining to the party-line scheme.

The invention is illustrated in the accompanying drawings in which—

Figure 2:
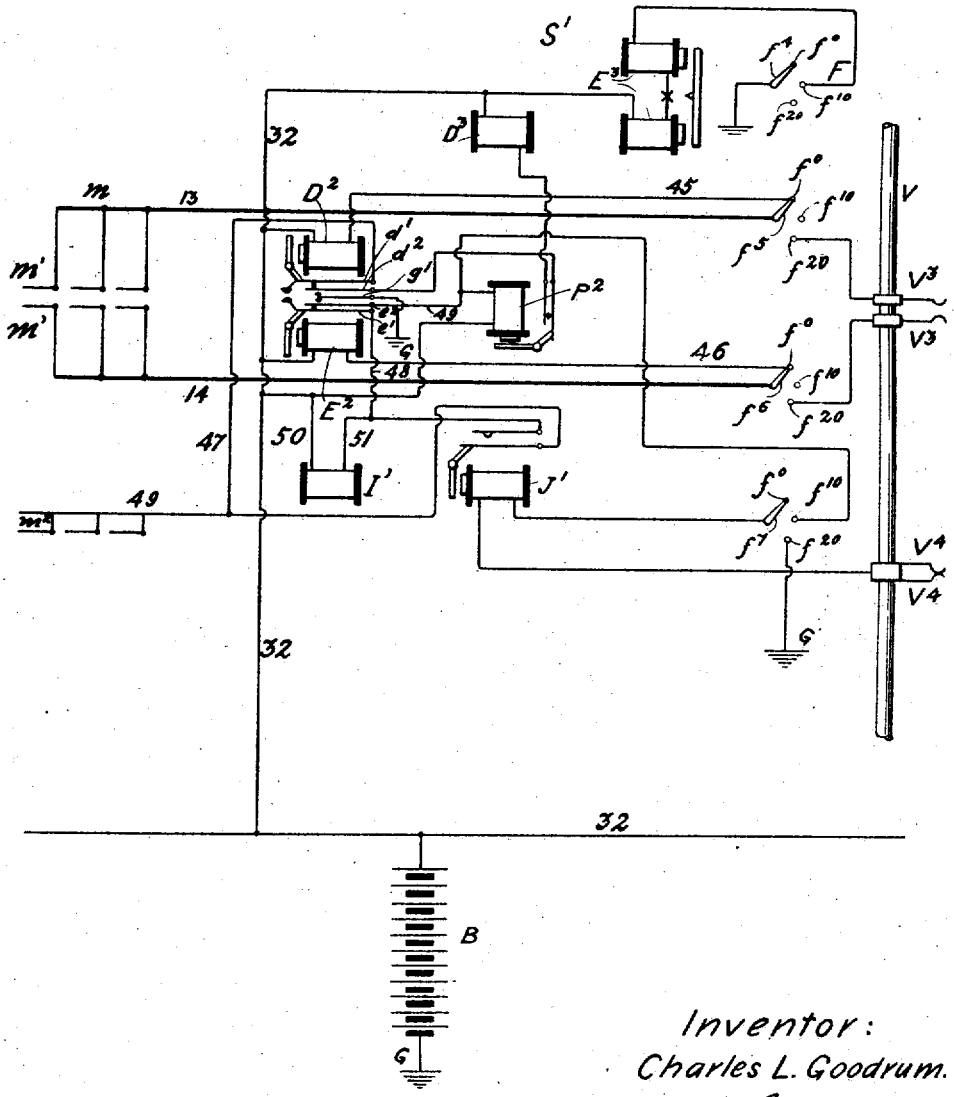
Figure 3:
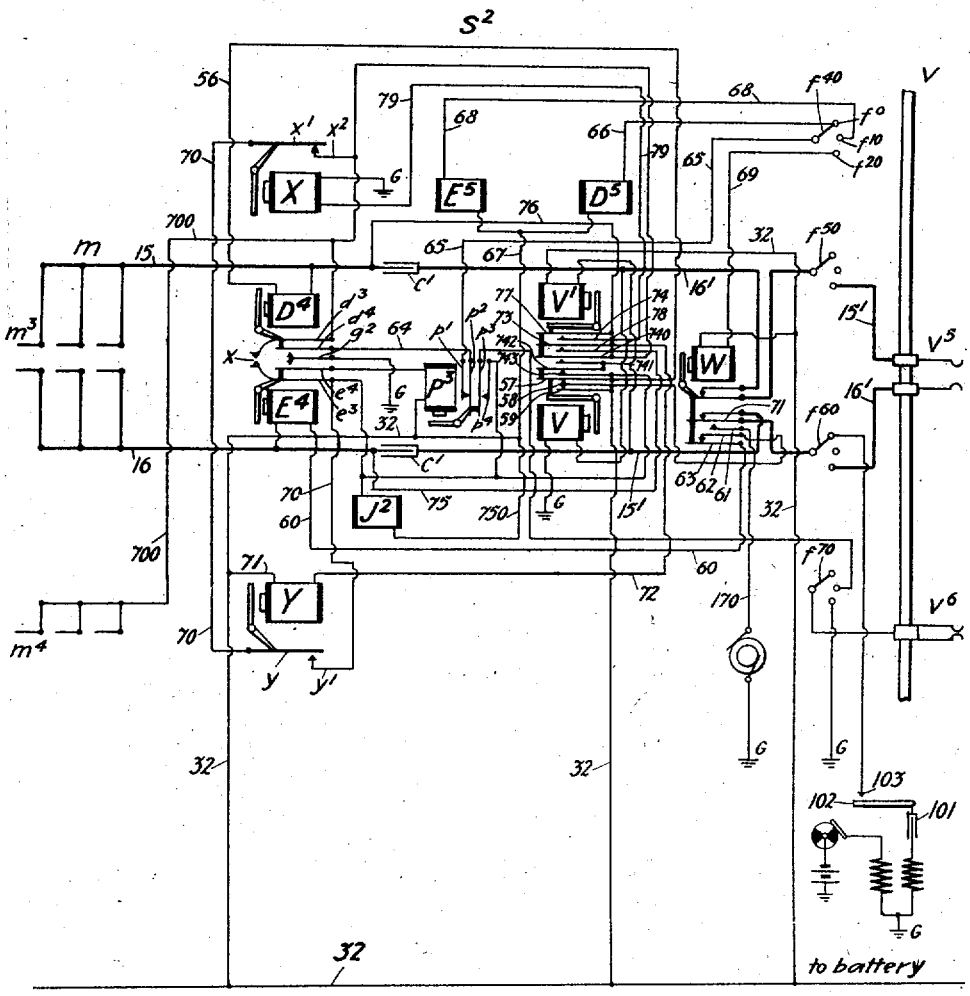
Figure 4:
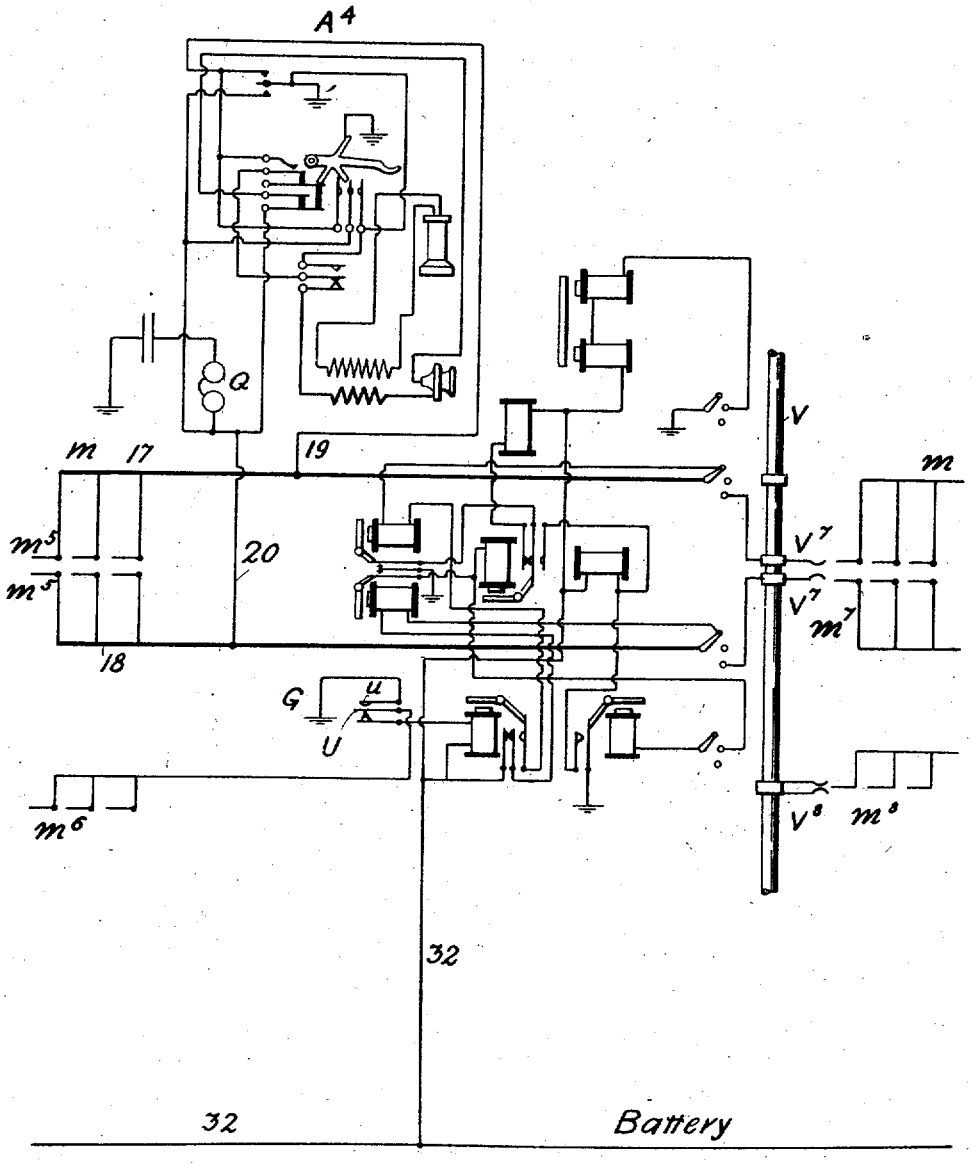
Figure 5:
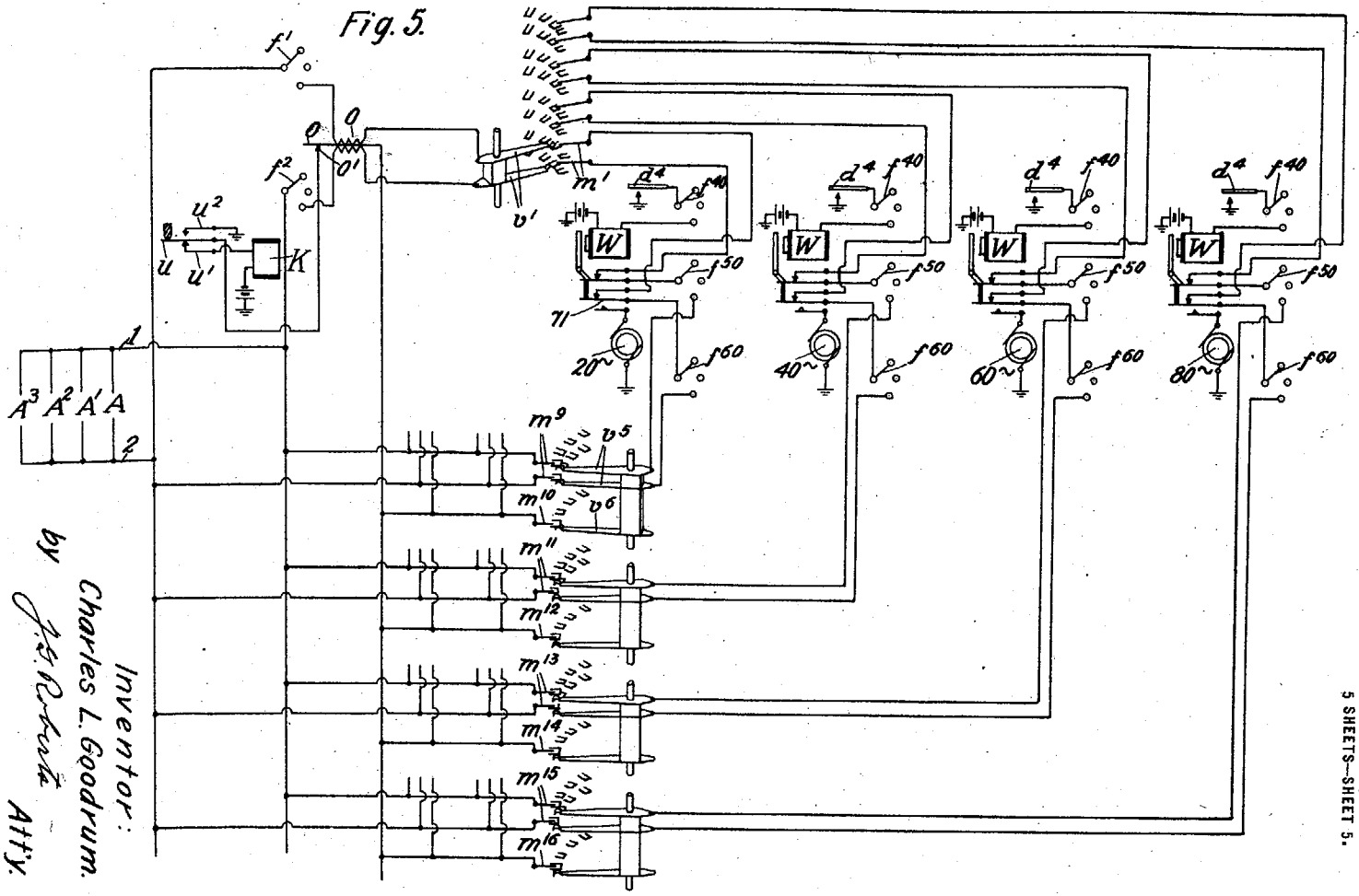

Figure 1 shows the circuit of the calling subscriber's line and its associated first selector switch; Fig. 2, the circuit of one of the second selector switches; Fig. 3, the circuit of a connector switch with which are associated the called subscriber terminals; Fig. 4, the circuit of a called substation and its associated first selector switch; and Fig. 5 is a diagrammatic showing of a party line illustrating the method of grouping the various party-line signaling sources with their associated connector switches.

The invention may be best described by first tracing a call from a calling to a called subscriber through the various switches without any reference to the party-line features associated therewith, after which the method of incorporating the party-line scheme in the system will be explained.

When a calling subscriber desires to make a call he will remove his receiver from the switchhook and operate his calling transmitter for the thousands digit in the number of the called subscriber's line desired. It will be assumed for convenience in description that the number of the subscriber desired is 4856. The calling subscriber having operated his calling transmitter for the numeral 4 will thereby place four successive grounds on the vertical side of the line. These grounds will complete a circuit from the ground shown at the impulse transmitter at the calling subscriber's station through the resistance $r$, contact springs $a^4$, $a^3$, contact springs $a^2$, $a$, wire 25 to the vertical side of the line 3 and thence through the side switch arm $f'$, wire 30, vertical relay D, wire 31, contact springs $k^3$, $k^2$, and $k'$ to the conductor 32 and the common battery. Consequently vertical relay D will be operated four successive times and will close the circuit of the vertical magnet a like number of times over a circuit which may be traced from the ground $g$, contact spring $d$, to contact springs $p^2$ and $p'$ of the private magnet P, and through the vertical magnet D′ and the wires 39 and 32 to the common battery. The successive energizations of the vertical magnet D′ will elevate the shaft of the first selector switch to a position where its wiper contacts $v'$ and $v^2$ will be in alinement with the multiple contacts $m'$ and $m^2$ which are connected to trunks leading to a second selector in the four thousands group.

After the impulse transmitter at the calling subscriber's station has transmitted the four grounded impulses to the vertical side of the line, a single grounded impulse will be transmitted over the rotary side of the line. This circuit may be traced from the ground at the subscriber's station through the resistance $r$, contact springs $a^4$ and $a^3$, contact springs $a^2$ and $a'$, wire 4, the vertical side of the line 12, side switch arm $f^2$, conductor 34, rotary relay E, conductor 33 and the contact springs $k^2$, $k'$, and wire 32 to battery. The subsequent operation of the rotary relay E will close a circuit from the ground $g$ by way of relay spring $e$ through the private magnet P and wire 32 to battery. This will cause the operation of the private magnet P which, in the well known manner, will move the side switch arms $f$, $f'$, $f^2$, $f^3$ into their second position. In this position of the side switch a circuit is closed from ground through the side switch arm $f$ to the rotary magnet E′ and over the conductors 39 and 32 to battery.

The operation of the rotary magnet moves the wiper contacts $v'$ and $v^2$ over the multiple contacts $m'$ and $m^2$ and likewise upon each operation interrupts its own circuit. When the contact wiper $v^2$ rests upon a multiple contact $m^2$ which is busy, that is, one which has been connected to the contact wiper $v^2$ of some other selector circuit, this contact will be grounded and a circuit will be established from the ground on the contact $m^2$, by way of contact wiper $v^2$, through the relay J, conductor 53, side switch arm $f^3$, conductor 40, private magnet P, and conductor 32 to battery. This will maintain private magnet P in its energized position until a non-grounded non-busy contact $m^2$ is found, at which time the private magnet P will be deenergized and the side switch will move into its third position extending the calling subscriber's line to the second selector switch shown in Fig. 2. The calling subscriber will next operate his impulse transmitter so as to send eight grounded impulses over the vertical side of the line in order to raise the second selector shaft to the eighth level of the selector contact bank, which contains trunks leading to the connector switch to the contact bank of which is wired the desired subscriber's line, number 4856. These eight grounded impulses will flow from the subscriber's station over the vertical side of the line to the side switch arm $f'$ of the first selector through one winding of the differential relay O, the vertical contact wiper $v'$, contact terminal $m'$, the conductor 13, side switch arm $f^5$, conductor 45, vertical relay $D^2$, and wire 32 to battery. These eight impulses over the vertical side of the line will cause a like number of operations of the vertical relay $D^2$. Each operation of the vertical relay $D^2$ will close a circuit from the ground spring $g'$ to the contact springs of the private magnet $P^2$ the vertical magnet $D^3$ and conductor 32 to battery. The successive energizations of the vertical magnet $D^3$ will elevate the shaft of the second selector switch to a position where its wiper contacts $v^3$ and $v^4$ will be in alinement with the multiple contacts $m^3$ and $m^4$, which are connected to trunks leading to connector switches in the eight hundreds group.

After the impulse transmitter at the calling subscriber's station has transmitted the eight grounded impulses to the vertical side of the line, a single grounded impulse will be transmitted over the rotary side of the line. This circuit may be traced from the ground at the subscriber's station to the rotary line wire 12, the side switch arm $f^2$, the second winding of the differential relay O, contact wiper $v'$, contact $m'$, side switch arm $f^6$, conductor 46 and through the rotary relay $E^2$ and the wire 32 to battery. The subsequent operation of the rotary relay $E^2$ will close a circuit for the private magnet which will move the side switch arms of the second selector into their second position, whereupon the rotary magnet will be switched into circuit and the contact wipers of the second selector will automatically hunt for an idle trunk to a connector switch in a manner identical to that described in connection with the first selector. The calling subscriber is now connected through the first and second selectors to a connector switch which contains the number of the desired subscriber's line. He will consequently operate his impulse transmitter so as to send five grounded impulses over the vertical side of the line in order to raise the connector shaft to the fifth level of the contact bank which contains the contacts of the desired called subscriber's line, number 4856. These five grounded impulses will flow over the vertical side of the line to the first selector switch, through the winding O of the differential relay, over the vertical side of the trunk leading to the second selector switch and thence over the vertical side of the trunk leading to the connector switch, where the circuit may be traced through the vertical relay $D^4$, conductor 56, contact springs 57, 58 and 59 to conductor 32 to battery. The subsequent five energizations of the vertical relay $D^4$ will close a circuit from the grounded spring $g^2$ and spring $d^4$ of the vertical relay $D^4$, the contacts $p^2$ and $p'$ of the private magnet $P^3$, conductor 65, side switch arm $f^{40}$, vertical magnet $D^5$ and conductors 67 and 32 to battery. These impulses will raise the shaft of the connector switch so that the contact wipers $v^5$ and $v^6$ will be raised in alinement with the contacts $m^5$ and $m^6$ of the fifth bank of the connector switch, which bank contains the connector terminals of the desired subscriber's number 4856.

Immediately after the five grounded impulses have been sent over the vertical side of the line, a single grounded impulse will be transmitted over the rotary side of the line. The circuit for this impulse over the rotary side of the line may be traced from the ground at the subscriber's station to the rotary line wire 12, the side switch arm $f^2$, one winding of the differential relay O, rotary side 14 of the trunk leading to the second selector switch, side switch arm $f^6$, rotary side 16 of the trunk leading to the connector switch, rotary relay $E^4$, contact springs 63 and 62 of the ringing relay W and contact springs 58 and 59 of relay V, to conductor 32 and battery. This will operate the rotary relay $E^4$, thereby closing a circuit from the grounded spring $g^2$ through the springs of the rotary relay and the winding of the private magnet $P^3$ to battery. The subsequent operation of the private magnet $P^3$ will move the side switch of the connector into its second position. The calling subscriber will next send impulses equal in number to the units digit of the number of the desired subscriber's line. As previously assumed, the number of the desired subscriber is 4856, and consequently the calling subscriber will send six impulses over the vertical side of the line which will cause six operations of the vertical relay $D^4$ over the circuit just traced. However, since the single grounded impulse which was sent over the rotary side of the line moved the side switch of the connector into its second position, the operation of the vertical relay in this case will close a circuit that may be traced from the grounded spring $g^2$ by way of the spring $d^4$ of the vertical relay, the springs $p^2$ and $p'$ of the private magnet $P^3$, conductor 65, side switch arm $f^{40}$, conductor 68 rotary magnet $E^5$ and conductors 67 and 32 to battery. The rotary magnet will, therefore, be operated six times and connect the contact wipers $v^5$ and $v^6$ to the contacts $m^5$ and $m^6$ of the desired subscriber's line 4856.

After the six impulses have been sent over the vertical side of the line, a single impulse will be transmitted over the rotary side of the line which will operate the rotary relay $E^4$, and this in turn will operate the private magnet $P^3$ in a manner similar to that described in connection with the grounded impulse which was transmitted over the rotary side of the line directly after the first set of impulses transmitted to the connector switch. If the subscriber's line is busy the multiple contacts $m^6$ of this line will be grounded, and a circuit will be closed from this ground through the side switch arm $f^{70}$, contact springs $p^3$ and $p^4$ of the private magnet $P^3$, the release magnet $J^2$ and conductors 750 and 32 to battery. Consequently, before the private magnet is de-energized the release magnet $J^2$ is operated, and the vertical shaft and the side switch of the connector will be returned to normal. Hence, when the calling subscriber attempts to ring the desired subscriber by depressing his ringing key and closing the contacts $a^{13}$, $a^{14}$, he will complete a circuit which may be traced from the ground at the subscriber's station through resistance $r$, by way of contact springs $a^4$—$a^3$, $a^{12}$—$a^{13}$, $a^{14}$, and $a^6$—$a^5$ to the vertical side of the line 11, side switch arm $f'$, contact wiper $v'$, multiple contact $m'$, side switch arm $f^5$, contact wiper $v^3$, multiple contact $m^3$, conductor 15, vertical relay $D^4$, conductor 56 and the contact springs 57, 58 and 59 of relay V to battery. This will operate the vertical relay $D^4$, and as the connector switch has been returned to normal the operation of this relay, as previously described, will energize the vertical magnet $D^5$ and elevate the vertical shaft of the connector switch one step. When the vertical shaft of the connector switch has been thus displaced from normal, a circuit will be completed from ground through one winding of the busy-back transformer, condenser 101, off-normal springs 102 and 103, side switch arm $f^{60}$, spring 71, rotary side of the trunk 16, contact $m^3$, wiper $v^3$, side switch arm $f^6$, conductor 14, contact $m'$, wiper $v'$, side switch arm $f^2$, rotary side of the line 12 through the subscriber's loop and back to the vertical side of the line 11, side switch arm $f'$, wiper $v'$, contact $m'$, conductor 13, side switch arm $f^5$, wiper $v^3$, contact $m^3$ and thence through the vertical relay $D^4$, conductor 56 and contacts 57, 58 and 59 to wire 32 and battery. The completion of this circuit will send the busy tone back to the calling subscriber, informing him that the party desired is busy, and he will hang up his receiver. When hanging up his receiver the calling subscriber will momentarily ground both sides of the line which will simultaneously energize the vertical relay $D^4$ and the rotary relay $E^4$, and this will release the switches as hereinafter described.

In case the desired party is not busy the last impulse on the rotary side of the line, as previously explained, will operate the rotary relay $E^4$, which in turn will operate the private magnet $P^3$ and this will move the side switch into its third position. The calling subscriber will then be connected through the first and second selector switches and the connector switch direct to the desired subscriber's line, number 4856. The calling subscriber must next send signaling current over the rotary side of the desired subscriber's line so as to operate the ringer Q. This is accomplished by closing the circuit at the ringing key springs $a^{13}$ and $a^{14}$ which, as previously described, will operate the vertical relay $D^4$. The operation of this relay will close a circuit from the grounded spring $g^2$ by way of conductor 64 to the contacts $p^2$ and $p'$ of the private magnet $P^3$, side switch arm $f^{40}$, the ringing relay W and conductor 32 to battery. The subsequent operation of the ringing relay W will connect the ringing generator by means of springs 61 and 71 to the rotary side of the line and thence through the side switch arm $f^{60}$, contact wiper $v^5$, contact $m^5$, conductors 18 and 20, through the ringer Q to condenser and ground. This will signal the called subscriber in the regular way, and when he removes his receiver from the switch hook he will close a circuit from battery, through relay V′ to the rotary side of the line and thence by way of spring 71 of the ringing relay W, side switch arm $f^{60}$, wiper $v^5$, contact $m^5$, through the subscriber's loop to the vertical side of the line, contact $m^5$, contact wiper $v^5$, side switch arm $f^{50}$, the vertical line springs of the ringing relay W, conductor 15′, and the winding of relay V to ground.

Relays V and V′ are constructed so as to have the same electrical characteristics. However, relay V′ is equipped with a set of springs which make contact when the relay is energized, whereas the springs of relay V serve to break contact when it is energized. Consequently, if these relays are simultaneously energized, the springs controlled by the armatures of the respective relays will affect their operation in such a manner that the springs of relay V will break contact before the springs of relay V′ make contact. Conversely, when the relays are simultaneously deenergized their respective spring combinations will affect the relay operation so that the springs of relay V′ will break contact before the springs of relay V make contact. Therefore, the springs 57, 58 and 59 of relay V are separated and the connections of relays $D^4$ and $E^4$ are broken before the relays X and Y and the common battery are bridged across the calling line circuit. In practice it might be difficult to obtain relays of like electrical characteristics. However, notwithstanding this fact and assuming that relay V′ might close its contacts before the relay V opens its contacts, the time interval during which the contacts of relay V and V′ are both closed would be of such short duration that a relay or electromagnet included in such circuit would not receive sufficient current for its operation. Obviously if such a condition should arise it could be readily overcome by making the relay V′ slightly slow to pull up and release.

It will be noted that the circuit just traced, containing relays V and V′, is connected to the line wires of the connector circuit on the called side of the condenser C′. This circuit consequently supplies talking current to the called subscriber. The operation of relay V disconnects the battery which is connected to the vertical and rotary relays $D^4$ and $E^4$ respectively, whereas the operation of V′ completes a circuit from battery through relay Y to springs 73 and 74 and thence to the rotary side of the line, from where this circuit is completed through the subscriber's loop back to the vertical side of the line and thence by way of conductor 76 through springs 77 and 78 and relay X to ground. Talking current is, therefore, fed to the calling subscriber over a circuit which includes relays X and Y, and the supply of this talking current is controlled by the called subscriber by means of relays V′.

Relays X and Y like relays V and V′ are designed with like electrical characteristics and control respectively a break and a make contact. These two relays function exactly the same as relays V and V′, and obviously relay Y could also be made slightly slow to pull up and release. Therefore, when these relays are simultaneously energized, the break contact of relay X will open before the contact of relay Y closes, and thus the release circuit, which is controlled by the simultaneous closing of the contacts of these two relays, will not become operative at this time.

The connection has now been traced to the point where the subscribers are talking. When the subscribers have completed their conversation and hang up their receivers, the switching apparatus will be returned to normal. If the calling subscriber hangs up his receiver before the called party does, the subscriber's loop will be opened at the calling party's station and thus will open the circuit containing the relays X and Y which, therefore, will be deenergized. However, as the subscriber momentarily grounds both sides of the line directly after the subscriber's loop is opened, the relay Y, which is connected from battery to the rotary side of the line, will be momentarily energized and again close its contact. Consequently, as relay X is deenergized and relay Y momentarily energized, a release circuit is closed which may be traced from the ground connected to the side switch arm $f^7$ (Fig. 2), through the release relay J′, to the contact wiper $v^4$, thence by way of contact $m^4$, the armature and contact spring of relay X, and the armature and contact spring of relay Y by way of conductor 70, the release magnet $J^2$ and the conductors 750 and 32 to battery. Thus the release magnet $J^2$ of the connector switch will be operated, and the switching apparatus associated with the connector switch will be restored to normal.

The release relay J′ of the second selector in operating closes a contact which completes a circuit from the ground connected to the side switch arm $f^3$ (Fig. 1) by way of the release relay J, conductor 52, contact wiper $V^2$, contact $m^2$, the contact springs of relay J′ and the release magnet I′ of the second selector to battery. The operation of the release magnet I′ restores the apparatus of the second selector switch to normal, while the operation of the release magnet J closes a circuit from ground through the contact springs of relay J, the release magnet I and conductors 42 and 32 to battery. The subsequent operation of the release magnet I restores the switching apparatus of the first selector.

Should the calling subscriber restore his receiver before the desired called subscriber answers, he will simultaneously energize relays $D^4$ and $E^4$ by the momentary grounding of both sides of the line. The simultaneous operation of these two relays will complete a circuit from battery by way of conductors 32 and 750 through the release magnet $J^2$, and thence through the contact springs $e^3$ and $d^3$ to the test contact $m^4$, the contact wiper $v^4$, the release relay J′ and the side switch arm $f^7$ to ground. The subsequent operation of the release magnet $J^2$ will restore the connector switch to normal, and the first and second selector switches will be thereafter restored to normal in a manner similar to that previously described.

In case the called subscriber hangs up his receiver before the calling subscriber, the subscriber's loop will be opened at the called subscriber's station. This will open the circuit containing the relays V and V′ which, therefore, will be deenergized. However, when the calling subscriber simultaneously grounds both sides of the line in hanging up, the relay V′ will be momentarily operated and this will close a circuit from battery by way of conductors 32 and 750 through the release magnet $J^2$, springs 743 and 742 of relay V, and springs 741 and 740 of relay V′ to multiple contact $m^4$, and thence by way of contact wiper $v^4$, the release relay J′, and the side switch arm $f^7$ to ground. The completing of this circuit will operate the release magnet $J^2$ and restore the connector switch to normal. The subsequent release of the first and second selector switches will be effected in a manner similar to that previously described.

The manner in which a call is initiated by the calling subscriber and is set up by the switches and extended to the called subscriber has been described in the foregoing description of the operation of the system. A more detailed consideration of the party-line features of this system will now be undertaken.

Referring to Fig. 1, it will be noted that four subscribers' stations are connected to the subscriber's line, one of which is illustrated in detail, whereas the other three are shown diagrammatically. Associated with the line wires connected to the first selector switch in Fig. 1 are shown four sets of contacts representing the line and test contacts of the party line at four different groups of connector switches. Each one of these sets of contacts, such as $m^9$—$m^{10}$, $m^{11}$—$m^{12}$, $m^{13}$—$m^{14}$ and $m^{15}$—$m^{16}$, is individual to one of the party-line subscribers. In other words, each set of these contacts appearing at the connector switch is utilized for calling selectively one only of the subscribers on the party line. The system may be adapted to any of the well known party-line signaling schemes, but in the preferred embodiment of the invention herein shown the party-line system is shown and described in connection with the harmonic party-line system. The system is shown in connection with a four-party telephone line, but it will be quite obvious that it can be adapted to a party-line system in which a greater or less number of party-line subscribers are connected to the line circuit. For party-line operation and signaling in a system of the type herein described, all the subscribers who are to be signaled by the same kind of signaling current are grouped in connector switches, with each group of which is associated a signaling source to which the signaling devices at the particular subscribers' stations will respond. The numbers of the party-line subscribers are divided preferably into groups of 100 each, each group of 100 representing party-line subscribers who are to be signaled by a particular type of signaling current. The multiple connections of these party-line subscribers terminate in connectors which are arranged in groups and which are served by the signaling source to which the signaling device of the particular party-line subscribers of the groups will respond. As it is well known in the operation of the Strowger system, the first selector selects the thousands digit of the desired subscriber's number, the second selector the hundreds digit, and the connector the tens and units digit. In other words, each horizontal row of contacts in the first selector represents one of the thousands digits in the number of the called subscriber from 1 to 10, and each horizontal row of contacts in the second selector represents one of the hundreds digits in the number of the called subscriber from 1 to 10. Consequently, in the selection of the given line the first selector is operated to select the thousands group required, the second selector to select the hundreds group required, and finally the connector selects the particular line desired.

It will be evident that in case all the party-line subscribers, which are to be signaled by a certain kind of ringing current, were gathered in a group of connector switches with which the particular type of signaling source for ringing those party-line subscribers is associated, the party desired can be selectively signaled if the connector switches could be properly selected by the subscribers at the first or second selector switches. This is accomplished by a system of numbering by virtue of which all the subscribers, which are to be signaled by a particular type of signaling current, will be gathered in one group; those to be signaled by another source of signaling current are gathered in another group; those to be signaled by a third source of signaling current in a third group, etc.; and in which the calling subscriber, due to such numbering, will automatically select a connector of the group associated with the ringing source necessary to signal the desired party-line subscriber. In the preferred embodiment of the invention herein shown, the subscribers are selected at the second selector switches and the numbering of the party-line subscribers is arranged accordingly.

As shown diagrammatically in Fig. 5, the party line 1—2 is directly associated with the first selector switch and has multiple contacts $m^9$, $m^{10}$ terminating in one connector switch, multiple contacts $m^{11}$ and $m^{12}$ terminating in a second connector switch, multiple contacts $m^{13}$ and $m^{14}$ terminating in a third connector switch, and multiple contacts $m^{15}$ and $m^{16}$ terminating in a fourth connector switch. Associated with each of these connector switches is shown diagrammatically the ringing relay W and its associated generator. Each connector switch is associated with its own particular source of generating current, and for a harmonic system, such as we have preferred to describe, these generators develop respectively a current of 20, 40, 60 and 80 cycles as shown. To simplify the drawing, only one connector switch and only the first lead of the contact bank of each switch is shown associated with each generating source, but it is to be understood that a group of these connector switches are connected to each of these sources and that there are ten levels to each contact bank of each switch. To further simplify the drawing the second selector switch has been omitted, but it should be understood that the same is introduced between the first selector and the connector to select the hundreds digit of the desired called subscriber. It will now follow that if the multiple subscribers' terminals of all the party-line subscribers, which are to be signaled by the first signaling source or 20-cycle alternating current, are grouped in connector switches associated with the 20-cycle ringing current, and those which are to be signaled by the other sources are grouped in connector switches associated with their particular sources of ringing current, the calling subscriber will selectively ring the particular party-line subscriber if he properly selects the connector switch associated with the desired signaling source. This is accomplished by allotting a particular group of hundred numbers to subscribers that are to be signaled by 20 cycles, another group of hundred numbers for subscribers that are to be signaled by 40 cycles, etc. This means that for the party line shown in Figs. 1 and 5 for instance, the subscriber A would be given number 1111, subscriber A′ number 1211, subscriber $A^2$ number 1311, and subscriber $A^3$ number 1411. Then as the subscriber's party-line multiple is grouped in the connector switches, in accordance with the signaling source with which the connector switches are associated, a calling subscriber will automatically select the particular selective signaling current required to call the particular subscriber as a result of the number which has been allotted to the particular subscriber. Thus, whenever an exchange subscriber calls the party-line subscriber No. 1111, the second selector will be directively set by the calling subscriber so as to hunt and select an idle trunk in the first level of the selector contact bank. The contacts of this bank are wired to a group of connectors associated with a 20-cycle ringing generator and, therefore, the calling subscriber will automatically select the signaling current required to ring party-line subscriber No. 1111, as a result of the regular operation in setting up a call through the switches to complete a connection. Likewise, when party-line subscriber No. 1211 is desired, the second level of contacts will be selected, which contacts are wired to a group of connectors associated with the 40-cycle ringing generator. To call subscriber 1311 the third level will be selected, the contacts of which are wired to a group of connectors associated with the 60-cycle ringing generator, whereas the multiple connector terminals of party-line subscriber 1411 are located in the banks of the connector switches which are wired to the fourth level of contacts in the second selector switches, etc.

The manner in which a party-line subscriber calls and signals another subscriber on his own line will now be described in connection with Fig. 5. Suppose that subscriber $A^3$ initiates a call, has set up the connection through the first selector switch and has been connected, as shown, to the connector switch, with which is associated a signaling current of 20 cycles. It will be assumed, for example, that the signaling device at the subscriber's station $A^3$, who originated the call, responds to a ringing current of 80 cycles, and that he desires to call the subscriber at station A whose signaling device responds to a signaling current of 20 cycles. When the calling subscriber transmits the grounded impulses for setting up the switches, they pass over either side of the line through one winding only of the differential relay O, and thence through the various vertical and rotary relays associated with the switches used in setting up the connection. Each impulse over either side of the line will, therefore, momentarily operate the differential relay O. The relay O will not be operated by a current flowing serially in the line circuit. As soon as the first selector switch associated with the calling subscriber has been displaced one step from normal, a busy potential is placed on the test lead of all the multiple contacts associated with that line over a circuit, which may be traced from ground by way of springs $u^2$ and $u$, contacts $o'$ and $o$ and the various multiple test contacts $m^{10}$, $m^{12}$, $m^{14}$ and $m^{16}$.

When the calling subscriber sends the final impulse over the vertical side of the line to the vertical relay $D^4$ of the connector switch, thereby connecting the wipers of the connector switch with the contact terminals of the desired line, an impulse is sent through the winding of the differential relay O connected serially in the vertical side of the line. This will energize the differential relay O, thereby breaking the contact between $o$ and $o'$, and this will momentarily remove the busy potential which has been placed on the multiple test contacts of the line. This momentary removal of this busy potential will permit the seizure by contact wipers $v^5$ of the connector of the multiple connector terminals of the line of the calling party-line subscriber.

As has been assumed and as shown in the circuit drawing, Fig. 5, the party desired is A whose signaling device responds to a ringing current of 20-cycle frequency. Consequently, when the calling subscriber operates his ringing key, he will momentarily energize the vertical relay $D^4$ associated with this connector switch, thereby placing ground on the spring $d^4$, and as the side switch is in its third position it will close a circuit through the ringing relay W which will therefore be operated. The operation of this relay will connect the 20-cycle generator to the spring, 71, and thus this signaling current will be transmitted over the side switch arm $f^{60}$, the rotary wiper of the connector switch and contact $m^9$ to the rotary side of the line, and through the signaling devices of all of the party-line subscribers in parallel. As the subscriber A is the only one equipped with a signaling device which will respond to a ringing current of 20 cycles, this subscriber will be the only one signaled. When he removes his receiver the two subscribers $A^3$ and A of the party line will be connected for conversation.

In a party-line system in which the subscribers' ringers are bridged from either side of the line to ground, special provision must be made for the actuation of the ringers tapped from the vertical side of the line. The resistance $r$ at the subscriber's station is used for this purpose. It will be evident that if there was no resistance in the circuit to ground, the subscriber upon depressing his ringing button would put a shunt circuit to ground on the vertical side of the line.

This shunt circuit would rob the ringers of the necessary current required for their operation. The resistance $r$ is, therefore, made high enough to prevent the shunting of the major portion of the ringing current, which will seek a path through the desired subscriber's ringer or signaling device. The resistance $r$ at the subscriber's station is further useful in preventing a premature disconnect on a party-line connection. Thus this resistance $r$ prevents a premature release by a subscriber on a party line who cuts in on a connection which had been previously established with another subscriber on the same party line. It will be evident that if a connection with a party-line subscriber has been established; that a second party on the party line, upon removing his receiver and cutting in on the connection and then restoring, will momentarily ground both sides of the line. Therefore, if the resistance $r$ were not included in the ground tap at the subscriber's station, both sides of the line would obtain a momentary connection direct to ground. This direct ground tap to the vertical side of the line would shunt out the relay X of the connector circuit, and the deenergization of this relay would close the release circuit and restore the switches to normal, as previously described. However, when the ground tap at the subscriber's station is wired through the resistance $r$, the relay X is connected to ground in parallel with the resistance $r$, and in this instance sufficient current will flow through the relay X to maintain it in its operative position and thereby prevent the premature disconnect.

Obviously, this invention is not limited to the specific arrangement herein shown and described, but is capable of many variations and applications without departing from its spirit and scope.

I claim.

1. In an automatic telephone system, a central exchange including a connector switch, subscribers' lines extending therefrom, a plurality of subscribers' stations, a plurality of sources of characteristic signaling current, each connector switch being associated with but one of said sources, a signaling device individual to each subscriber's station responsive to a characteristic signaling current, and a plurality of said devices connected to one of said lines, and means whereby subscribers connected to other lines may select and call one of the said plurality of subscribers.

2. In a telephone system, a central exchange including a connector switch, subscribers' lines extending therefrom, a plurality of subscribers' stations, a plurality of sources of characteristic signaling current, one of said sources being associated with each connector switch, a signaling device individual to each station responsive to a characteristic signaling current, a plurality of said devices connected to one of said lines, and means at the central station controlled by the subscriber for automatically selecting and calling any one of said plurality of subscribers.

3. In a telephone exchange system, a subscriber's line and a plurality of subscribers' stations connected thereto, automatic connective means for said line common to all of said subscribers whereby the line may be connected with other lines as determined by any one of said subscribers, and other automatic connective means associated with the first means but individual to the several subscribers on the line whereby any one subscriber can be selected and called to the exclusion of the others.

4. In a telephone exchange system, a central office and subscribers' lines leading therefrom, a plurality of subscribers' stations on one line, automatic switching apparatus at the central office for interconnecting the lines, a portion of said apparatus being individual to the lines whereby calls incoming from the subscriber to the central office may result in connection with other subscribers as required, and another portion of said apparatus common to the subscribers, together with means whereby the selection of a subscriber's common switching apparatus will automatically select suitable current to send over the proper path to call the individual subscriber desired.

5. In a telephone exchange system, a central office and subscribers' lines leading therefrom, one or more of said lines having a plurality of stations connected thereto, automatic switching aparatus for each line whereby the lines may be interconnected, said switching apparatus comprising connection terminals individual to the line, each brought into service in response to a call over its line for connection with other lines, and other connection terminals individual to the subscribers for calling said subscribers in completing connections originating at other stations, each adapted for calling its own subscriber only, irrespective of other connections.

6. In a telephone system, a plurality of lines each having a plurality of stations, said stations being provided with selective signaling devices, a plurality of switches for said lines to which said lines are connected in multiple, said switches being arranged in groups, each group having a different selective signaling means, each station of each line being represented in the group having selective signaling means corresponding in character to the selective signaling devices of said station.

7. In a telephone system, a plurality of lines each having a plurality of stations, each station on each line having a ringer of different character, a plurality of switches for each line to which said lines are connected in multiple, said switches being arranged in groups, each group having a source of ringing current of different character, each station of each line being represented in a group having ringing current corresponding to the ringer of said station.

8. In a telephone system, the combination of two telephone lines, a plurality of substations on one line and a plurality of terminals for said line corresponding to each of the substations thereon, each of said terminals being arranged in a different switch having different selective signaling means, selective signaling devices at the said substations corresponding to the signaling means of its switch, and means for connecting the other line with one of said switches.

9. In a telephone system, the combination with two telephone lines, a plurality of substations on one of said lines and a plurality of terminals for said line corresponding to each of said substations, of a plurality of devices for providing signaling currents of different cycles, a signaling instrument adapted to respond only to one of said currents arranged at each substation, a plurality of switches common to the other line and adapted to connect it with one of the terminals of the first mentioned line, and means for applying the proper signaling current to the connected line.

10. In a telephone system, the combination with two telephone lines, a plurality of substations on one of said lines, and a plurality of terminals for said line corresponding to each of said substations, of a plurality of devices for providing signaling currents of different cycles, harmonic signaling instruments each responding to one of said currents arranged at the substations, and mechanism for connecting the other line with terminals of the first mentioned line corresponding to a particular substation thereon and applying to the connected line the proper current for operating the signaling apparatus corresponding to the selected terminals.

11. In a telephone system, the combination with an exchange, telephone lines extending therefrom each having a plurality of terminals arranged in groups, switching mechanism cooperating with said groups of terminals for connecting the lines, devices for supplying different signaling currents, of a plurality of substations on each line, harmonic signaling instruments each responsive to one of said currents one of which is located at each substation on each line, and means for applying the different signaling currents to the different groups of terminals.

12. In a telephone system, the combination with an exchange, telephone lines extending therefrom each having a plurality of substations and a plurality of terminals, the terminals of each line corresponding to the respective stations thereon, those of similar stations on the several lines being arranged in groups, of devices for supplying different signaling currents to the different groups of terminals, harmonic signaling instruments located at the various stations, and switching mechanism cooperating with the terminals to connect different telephone lines.

13. In a telephone system, the combination with an exchange, party telephone lines extending therefrom provided with a selective terminal for incoming calls and with as many terminals for outgoing calls as there are telephone and signaling instruments on the line, the corresponding outgoing terminals of the several lines being arranged in groups, of means for supplying to each of said groups of terminals different signaling currents adapted to call stations of the class only to which the corresponding party-line instruments belong, and means for connecting the incoming terminal of one line with one of the outgoing terminals of another.

14. In a telephone system, the combination with a plurality of party lines each connected to a plurality of subscribers' telephone and harmonic signaling instruments, said signaling instruments on the several lines being divided into classes each of which is adapted to be operated by a different signaling current, multiple contacts for each line corresponding to the several telephone instruments thereon which are arranged in groups corresponding to said classes of subscribers' instruments, of a separate source of signaling current for each of said classes of instruments, means for applying said current to the corresponding groups of terminals, and switching devices cooperating with the latter for connecting one telephone line with another.

15. In a telephone system a central exchange including a connector switch provided with movable and stationary terminals, a plurality of sources of characteristic signaling current, a plurality of subscribers' lines, a plurality of subscribers' stations connected to said lines, a signaling device individual to each station responsive to a characteristic signaling current, and means at the central exchange controlled by the calling subscriber for automatically connecting one of said sources to said terminals to call any one of said plurality of subscribers.

16. In an automatic telephone system, the combination with subscribers' party lines, of a plurality of sources, of characteristic signaling current, a signaling device at each substation responsive to one only of said sources, connector switches each associated with one only of said sources, and means to group the subscribers' line terminals at the connector switches so that a subscriber on a partly line can be selectively called.

17. In an automatic telephone system, the combination with subscribers' party-line circuits, of a plurality of sources of characteristic signaling current, signaling devices at the substations responsive to one only of said sources, connector switches, one of said sources being individual to a group of said switches, said party line being multipled to a plurality of said groups, and means to select a particular switch in a group whereby a subscriber on a party line can be selectively called.

18. In an automatic telephone system, the combination with party-line circuits, of a plurality of sources of characteristic signaling currents, signaling devices at the substations responsive to one only of said sources, groups of subscribers' lines, a plurality of connectors each provided to serve a different group of lines, and means whereby a signaling source individual to said group will selectively ring a subscriber on a party line.

19. In an automatic telephone system, the combination with party lines, groups of switches automatically controlled by the subscriber to establish a connection, a plurality of sources of characteristic signaling current, each of said sources being individual to a group of said switches, and means for selecting a particular source of said signaling current at one or another group of said switches to selectively signal one only of the subscribers on a party line.

20. In a telephone exchange system, a telephone line, a plurality of substations on said line, means adapted to place a test guard on said line when taken for use, and means for momentarily removing said test guard the instant a connection is completed when the calling and called subscriber stations are both connected to the same line.

21. In a telephone system, a telephone line, a plurality of subscriber stations on said line, means adapted to place a test guard on said line when it is taken for use, and means actuated when one of the subscribers on said line is calling to momentarily remove said test guard the instant the connection is completed with another subscriber station on said line.

22. In an automatic telephone system, the combination with subscribers' lines, a plurality of substations connected to some of said lines, automatic switching devices controlled by the subscriber to establish connection between two of said lines, of means at the subscriber station to automatically release said devices and means to prevent the release of said devices by a subscriber on a party line when another subscriber station on the party line is connected for conversation.

23. In an automatic telephone system, the combination with subscribers' lines, a plurality of subscribers' stations connected to some of said lines, automatic switching devices controlled by the subscribers to establish a connection between two of said subscriber stations, of means to release said devices when one of said connected subscribers hangs up his receiver, and means to prevent the release of said devices by a subscriber on a party line when the receiver of another subscriber on the party line is off the switchhook.

24. In a telephone exchange system, a line, answering and calling terminals for said line, a connecting circuit, means for extending said circuit to one of said terminals, means operative upon extending said circuit to one of said terminals for causing said line to test busy at the other terminal, and means for removing the busy test from the last mentioned terminal while the connecting circuit is extended to one of said terminals.

25. In a telephone exchange system, a line, answering and calling terminals for said line, a connecting circuit, means for extending said circuit to said answering terminal, means operative upon extending said circuit to said answering terminal for causing said line to test busy at said calling terminal, and means for removing the busy test from said calling terminal while the connecting circuit is extended to the answering terminal.

26. In a telephone exchange system, a line, answering terminals and multiple calling terminals for said line, a connecting circuit, means for extending said circuit to said answering terminal, means operative upon extending said circuit to said answering terminal for causing said line to test busy at said multiple calling terminals, and means operative while said connecting circuit is extended to said answering terminal for causing said line to test idle at said multiple calling terminals.

27. In a telephone exchange system, a plurality of lines, a selector switch for selecting a line, means associated with said selector for preventing the seizure of busy lines, and electromagnetically operated means for permitting said selector to seize a line while it is busy.

28. In a telephone exchange system, a plurality of lines, a selector switch for selecting one of said lines, test means associated with said selector switch normally tending to prevent the seizure of a busy line, and electromagnetically operated means for controlling said test means to permit said selector switch to seize a line while it is busy.

29. In a telephone system, an automatic connector, telephone lines divided into groups, a manually operable switching device, and means for controlling said connector from said switching device to connect with either a busy or an idle line, said connector having one motion to select groups and a second motion to find the called line in any selected group.

30. In a telephone exchange system, a plurality of lines, selector switches for selecting a line, means for preventing the seizure of busy lines, a connecting circuit, automatic switching mechanism for extending the same towards one of the selectors, and means controlled by said mechanism for rendering a busy line selectable.

31. In a telephone exchange system, a plurality of lines, automatic selector switches for selecting a desired line, means associated with said selector switches for preventing the seizure of busy lines, and means automatically operative under certain conditions for permitting one of said selector switches to seize a desired line while it is busy.

32. In a telephone exchange system, a plurality of lines, connector switches for selecting a desired line, means for preventing the seizure of busy lines, a connecting circuit, automatic switching mechanism for extending the same towards one of said connectors, and means controlled by said mechanism for causing a busy desired line to test idle.

33. In a telephone exchange system, a plurality of lines, connector switches for selecting the desired line, test means at said connector switches normally operative to prevent the seizure of busy lines, a connecting circuit, automatic switching mechanism for extending the same towards one of the said connectors, a switch for controlling the operation of said switching mechanism, and means controlled by said switching mechanism for causing said connector to seize certain of said lines whether busy or idle.

34. In a telephone exchange system, a selector switch, movable and stationary contacts for said switch, connecting circuits terminating in said movable contacts, lines terminating in said stationary contacts, a busy test condition for said lines, and automatic means operative upon the extension of said connecting circuit to one of said lines for removing the busy test condition from said line.

35. In a telephone exchange system, a plurality of lines, a connecting circuit, automatic switching mechanism for extending a calling line through said connecting circuit, a test circuit for said calling line closed upon the extension of said line, a relay for controlling said test circuit, a connector adapted to extend said connecting circuit to said calling line, automatic testing means associated with said connector, and means operative upon the building up of said connecting circuit for actuating said relay to permit the seizure of the calling line by said connector.

36. In a telephone exchange system, a selector switch, stationary and movable contacts for said selector switch; lines terminating in said stationary contacts and connecting circuits in said movable contacts, means for extending a calling line to a connecting circuit, means including said selector switch for extending said connecting circuit through said movable and stationary contacts to the calling line, means for rendering extended lines unselectable, and automatic means for rendering said calling line selectable while it is extended to said connecting circuit.

37. In a telephone exchange system, a plurality of lines, a connecting circuit, means for extending desired line to one and means for extending it to the other end of said circuit, means for placing a characteristic potential on busy lines, and means for removing the characteristic potential from the desired line while it is connected to said circuit.

38. In a telephone exchange system, a plurality of lines, a connecting circuit, means for extending desired line to one and means for extending it to the other end of said circuit, means for placing a characteristic potential on busy lines, and automatic means controlled during the extension of said circuit for removing the characteristic potential from the desired line while it is connected to said circuit.

39. In a telephone exchange system, a plurality of lines, a connecting circuit, means for extending one end of said circuit to a calling line, means for extending the other end of said circuit to said calling line, means for placing a characteristic potential on lines to which one end of said circuit is extended, and means operative during the extension of the other end of said circuit for removing said potential from said line.

40. In a telephone exchange system, a plurality of lines, a connecting circuit, means for extending the same in both directions, means operative upon the extension of said circuit in one direction for placing a characteristic potential on a calling line, and means actuated upon the extension of said circuit in the other direction for removing said potential from the line.

41. In a telephone system, telephone lines divided into groups, an automatic connector having one motion to select groups and a second motion to find a line in a selected group, a manually operable switching device, and means for controlling said connector from said switching device by means of its two operating motions to connect with and test either a busy or an idle line.

42. A telephone exchange system including a line connecting a plurality of party telephone stations with an exchange, said telephone stations having signal receivers responsive to currents of different character;

selecting mechanism at the exhange for extending the line thereat; a plurality of sources of signaling current for supplying the signal receivers with current to which said signal receivers are responsive; and means governed at a party line station for causing said selecting mechanism selectively to connect a source of signaling current with said line to suit the signal receiver at another party line station to be selectively signaled.

43. In a telephone exchange system, the combination of a telephone line, a plurality of substations on said line, a ringer at each substation, and centralized means controllable from any one of said substations for projecting alternating currents of different frequency onto said line to selectively operate said ringers.

44. In a telephone exchange system, the combination of a telephone line, a plurality of substations on said line, a ringer at each substation, and centralized means controllable from any one of said substations for projecting ringing currents of different characteristics onto said line to selectively operate said ringers.

45. In a telephone system, a line, a plurality of substations on said line, a connector switch, said switch being provided with a terminal of said line, means for engaging said terminal when one subscriber calls another on the same line, a test circuit for said line, means for applying an electrical guarding condition to said test circuit, and for temporarily changing said guarding condition to permit said connector to connect with the line.

46. In a telephone system, a line, a plurality of substations on said line, a connector switch, said switch being provided with a terminal of said line, means for placing an electrical guarding condition on said terminal when a party at one of said substations originates a call, a sender at said substation for setting said connector to select another substation on said line and means operated thereby for temporarily changing said guarding condition to permit said connector to connect with said line.

47. In an automatic exchange system for party line telephones, exchange mechanism for connecting subscribers' lines, multiple line contacts provided in said exchange mechanism for each party line subscriber's circuit, ringing mechanism, electromagnetic mechanism for associating ringing mechanism with said multiple line contacts, switch contacts and means for causing a definite electrical condition thereof whereby normally a circuit when in use will appear "busy" to any other circuit attempting connection therewith, and prevent such connection, and switching means associated with said exchange mechanism, to suspend the operation of said "busy" switch contacts when a calling party line subscriber's apparatus calls a party line subscriber's apparatus on the same line.

48. In an automatic exchange system for party line telephones, exchange mechanism for connecting subscribers' lines, multiple line terminals provided in said exchange mechanism for each party line subscriber's circuit, ringing mechanism, electromagnetic mechanism for associating ringing mechanism with said multiple line terminals, switch contacts and means for causing a definite electrical condition thereof whereby normally a circuit when in use will appear "busy" to any other circuit attempting connection therewith, and prevent such connection, and automatic means associated with said exchange mechanism, to suspend the operation of said "busy" switch contacts when a calling party line subscriber's apparatus calls a party line subscriber's apparatus on the same line.

49. In an automatic exchange system for party line telephones, exchange mechanism for connecting subscribers' lines, multiple line terminals provided in said exchange mechanism for each party line subscriber's circuit, ringing mechanism for furnishing currents of different electrical character, electromagnetic mechanism for associating ringing mechanism selectively with said multiple line contacts, thus to send selective signaling currents over said party line subscriber's circuit.

50. In an automatic exchange system for party line telephones, exchange mechanism including wipers for connecting subscribers' lines, line terminals provided in said exchange mechanism for each party line subscriber's circuit, ringing mechanism for furnishing currents of different frequency, electromagnetic mechanism and circuit connections for connecting ringing mechanism selectively through said wipers to the line terminals of a party line subscriber's circuit, thus to send selective signaling currents over said party line subscriber's circuit, and means at the telephones for operating said electromagnetic mechanism.

51. In an automatic exchange system for party line telephones, exchange mechanism for connecting subscribers' lines, line terminals provided in said exchange, exchange operating mechanism for each party line subscriber's circuit, calling mechanism, electromagnetic mechanism for associating calling mechanism with said line terminals, automatic means whereby normally a circuit when in use will appear busy to any other circuit attempting connection therewith, and prevent such connection, and additional automatic means associated with said exchange mechanism to suspend the operation of said first aforesaid automatic means when a calling party line subscriber's apparatus calls a party line subscriber's apparatus on the same line.

52. A telephone system comprising party telephone lines, automatic switch mechanism having contact makers for interconnecting said lines, signaling currents, and means for connecting said currents through certain of the contact makers for operating the substation call bells of the party lines selectively.

53. A telephone system comprising party telephone lines, signaling bells at the substations of said lines responsive to different frequencies of ringing current, automatic switches for interconnecting said lines, signaling apparatus including call generators of different frequencies corresponding to the substations, and means for connecting such generators to ring the substation call bells selectively.

54. A telephone system comprising party telephone lines, a call bell included in a circuit of each substation on each line, said bells being responsive to different predetermined frequencies of signaling current, automatic switch mechanisms for interconnecting said lines, signaling currents of different frequencies corresponding to the substations, and means for applying said currents for operating said call bells selectively.

55. A telephone system including a calling telephone line and a called polystation telephone line, a directively controlled step-by-step selector switch and a directively controlled connector switch for use in connecting said lines in a conversational circuit, a pair of talking wipers for said connector switch through which said conversational circuit extends, a test wiper for said connector switch for testing called lines, and means responsive to interruptions of the calling subscriber's line circuit to operate said switches to extend a connection to the called subscriber's line and to selectively signal the desired substation upon the called line.

56. A telephone system including a calling polystation telephone line provided with calling and called contacts, directively controlled automatic switches for use in extending a connection from the calling contacts of said line to the called contacts thereof, means responsive to interruptions of the calling subscriber's line circuit to operate said switches, a pair of talking wipers and a test wiper for the directively controlled switch that connects to the called contacts of said line, means for making said subscriber's line test busy when a call is initiated thereover, means for removing said busy condition when said test wiper tests said called contacts, and means for selectively signaling the desired substation upon said line.

57. A telephone system including a calling polystation telephone line provided with calling and called contacts, directively controlled automatic switches for use in extending a connection from the calling contacts of said line to the called contacts thereof, means responsive to interruptions of the calling subscriber's line circuit to operate said switches, a pair of talking wipers and a test wiper for the directively controlled switch that connects to the called contacts of said line, means for placing a busy potential upon the called contacts of said line when a call is initiated thereover, and means for removing said busy potential when said test wiper tests said called contacts.

58. A telephone system including a calling telephone line and a called polystation telephone line, a directively controlled step-by-step selector switch and a directively controlled connector switch for use in connecting said lines in a conversational circuit, a pair of talking wipers for said connector switch through which said conversational circuit extends, a test wiper for said connector switch for testing called lines, and means responsive to impulses created in the calling subscriber's line circuit by grounding and interrupting said calling subscriber's line circuit to operate said switches to extend a connection to the called subscriber's line and to selectively signal the desired substation upon the called line.

59. A telephone system including a calling polystation telephone line provided with calling and called contacts, directively controlled automatic switches for use in extending a connection from the calling contacts of said line to the called contacts thereof, means responsive to impulses created in said calling subscriber's line circuit to operate said switches, a pair of talking wipers and a test wiper for the directively controlled switch that connects to the called contacts of said line, means for making said subscriber's line test busy when a call is initiated thereover, means for removing said busy condition when said test wiper tests said called contacts, and means for selectively signaling the desired substation upon said line.

CHARLES LANE GOODRUM.